(No Model.)

D. HAND.
TAIL GUARD AND LINE REST.

No. 428,337. Patented May 20, 1890.

WITNESSES:

INVENTOR:
D. Hand
Munn &Co
ATTORNEYS

UNITED STATES PATENT OFFICE.

DAVID HAND, OF NETHERWOOD, NEW JERSEY.

TAIL-GUARD AND LINE-REST.

SPECIFICATION forming part of Letters Patent No. 428,337, dated May 20, 1890.

Application filed October 5, 1889. Serial No. 326,112. (No model.)

*To all whom it may concern:*

Be it known that I, DAVID HAND, of Netherwood, in the county of Union and State of New Jersey, have invented a new and useful Tail-Guard and Line-Rest, of which the following is a full, clear, and exact description.

My invention relates to an improved tail-guard and line-rest, and has for its object to provide a device capable of attachment to any harness which will effectually prevent the tail of the horse from becoming entangled with the lines. A further object of the invention is to provide a means whereby a rest will be provided for the lines and the latter held at an elevation above the harness and from becoming entangled therewith.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
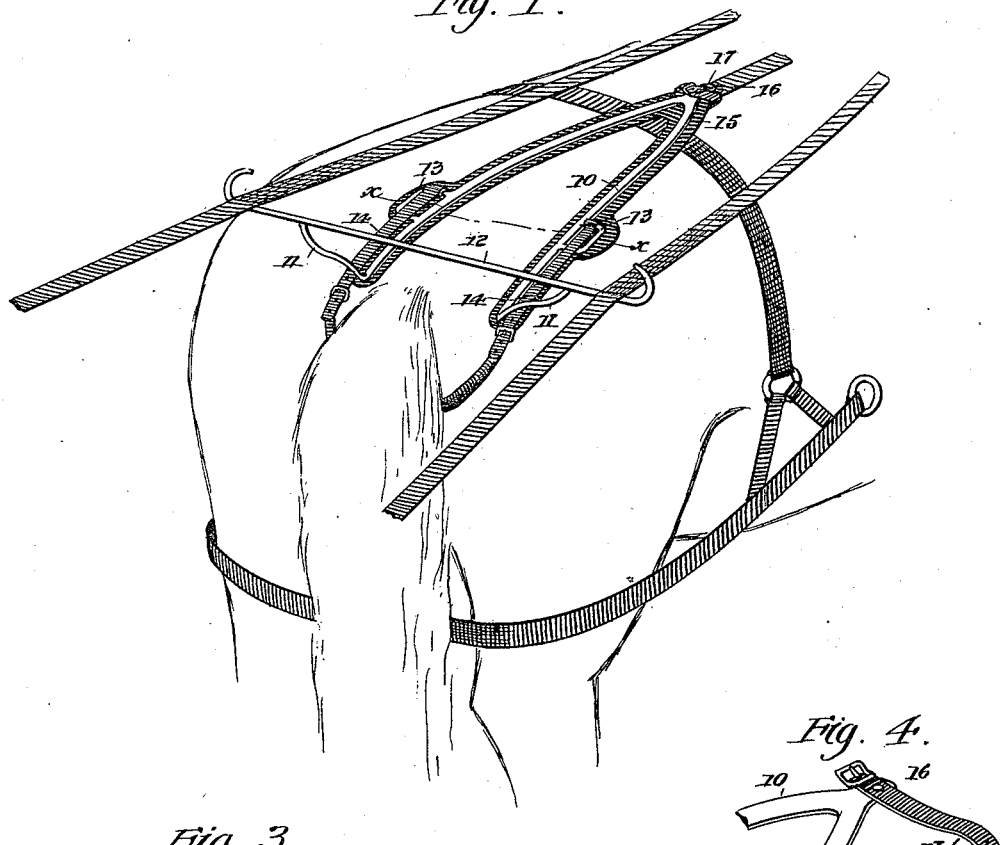
Figure 3:
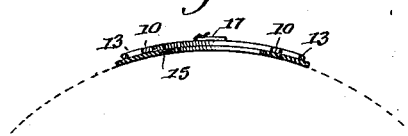
Figure 4:
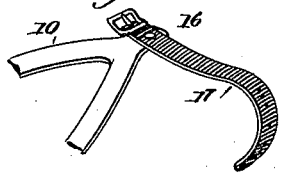
Figure 2:
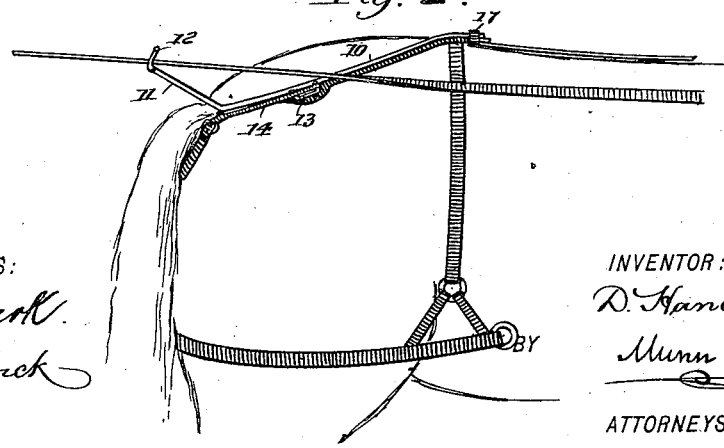

Figure 1 is a perspective view of the device illustrated as attached to a harness and in position upon the animal. Fig. 2 is a side elevation of the device also attached to a harness and in position upon the animal. Fig. 3 is a transverse section on line $x$ $x$ of Fig. 1, and Fig. 4 is a detail perspective view of the forward portion of the body of the device.

In carrying out the invention the body 10 of the device consists, preferably, of a metal strip bent essentially to a V shape and having the extremities of its members bent upward and outward in opposite directions to form standards 11, which standards are attached to and support a horizontal rest-bar 12, provided with upturned ends.

The angle of the standards with respect to the body 10 is best shown in Fig. 2, and by reference to Figs. 1 and 3 it will be observed that the body 10 is so curved longitudinally and in cross-section as to strictly conform to the back and crupper of the animal. Each member of the body 10 is provided upon its outer edge, at or near the center, with an integral loop 13, and to the forward cross-bar of each loop a billet 14 is secured.

In order that the body will not chafe or injure the back of the animal in the slightest degree, a pad 15, of any approved construction, is secured to the under face of the said body-bar, which pad extends from the forward end of the body, preferably, slightly beyond the point where the standards 11 are connected with the body, as best illustrated in Fig. 1. The pad is also provided at each outer side with an extension, upon which the loops 13 rest.

The body 10 is further provided at its forward end with a neck 16, to the upper surface of which a strap 17 is secured, provided at its attached extremity with a buckle or equivalent fastening device.

I desire it to be distinctly understood that while I have illustrated the body as constructed of a flat bar of metal, metal in other forms may be employed, or other material may be substituted for metal. I further desire it to be understood that instead of upturning the ends of the rest-bar the said ends may be enlarged in any suitable or approved manner to prevent the lines from sliding over the extremities.

In operation the body 10 is placed upon the crupper and back of the animal, and the billets 14 are respectively attached to the extremities of the crupper-strap of the harness. The body is further secured to the harness by passing the forward strap 17 under the back-strap of said harness and into the buckle, thus virtually tying the forward end of the device to the rear end of the back-strap; but the neck may be attached to any other portion of the harness, if deemed advisable. It is obvious that in this way a complete guard is provided, inasmuch as the rest-bar, extending, as it does, over and beyond the root of the tail of the animal, effectually limits its vertical movement and prevents the tail from becoming entangled with the harness. It will also be observed that the rest-bar acts as a support and guide for the lines.

Having thus described my invention, I claim as new and desire to secure by Letters Patent—

1. As an improved article of manufacture, a tail-guard and line-support consisting of an essentially V-shaped body curved longitudinally and having the ends of its members upwardly and outwardly bent, each of said members being provided with a lateral side extension, a rest-bar horizontally supported by the upturned ends of the body, and means, substantially as shown and described, for attaching the body at its contracted end to the back-strap of a harness.

2. In a tail-guard and line-support, the combination, with a body portion essentially V-shaped and standards integral with the extremities of the body members, said standards being upwardly and rearwardly projected, and a rest-bar supported horizontally by said standards, of a pad attached to the under side of the body, billets secured to said body and adapted for attachment to the crupper-strap of the harness, and a buckle-strap secured to the forward end of the body, adapted to tie the back-strap of the harness to the said body, substantially as shown and described.

3. In a tail-guard and line-support, the combination, with an essentially V-shaped body, standards upwardly and rearwardly projected in opposite directions from the extremities of the members of the body, a rest-bar horizontally supported by said standards, and a loop integral with the outer edge of each member of the body, of a pad secured to the under face of the body and extending beneath the loops, a billet attached to each of said loops capable of attachment with the crupper-strap, and a strap having a buckle at one end attached to the forward extremity of the body, capable of tying the back-strap of a harness to said body, substantially as shown and described.

DAVID HAND.

Witnesses:
J. T. ACKER, Jr.,
C. SEDGWICK.